United States Patent Office 3,544,605
Patented Dec. 1, 1970

3,544,605
PROCESS FOR OBTAINING HIGHLY PURIFIED PHOSPHATIDYLCHOLINE AND THE PRODUCT OF THIS PROCESS
Hans Betzing, Horrem, Bezirk Cologne, and Hans Eikermann, Cologne-Braunsfeld, Germany, assignors to A. Nattermann & Cie GmbH, Braunsfeld, Germany, a corporation of Germany
No Drawing. Filed Aug. 21, 1968, Ser. No. 754,489
Claims priority, application Germany, Aug. 21, 1967, 1,617,679, 1,617,680
Int. Cl. A23j 7/00
U.S. Cl. 260—403
6 Claims

ABSTRACT OF THE DISCLOSURE

Process for obtaining highly purified phosphatidylcholine with a high content of essential fatty acids from vegetable lecithins, comprising dissolving the crude oil-containing phosphatides in ethyl acetate or a dischlorinated hydrocarbon having 1 to 4 carbon atoms or a mixture of such solvents, treating the resulting solution with a quantity of aluminium oxide at least five times the amount of the crude phosphatide used in order to adsorb the crude phosphatides on the aluminium oxide, separating the aluminium oxide, and eluting the phosphatidylcholine therefrom by means of an alcohol; and the highly purified phosphatidylcholine obtained by the process.

---

The invention relates to a process for obtaining highly purified phosphatidylcholine which is free of, or heavily depleted in, cephalins, from commercially available crude phosphatide mixtures of vegetable origin, the so-called commercial lecithins, of which about one third consists of oil. These crude phosphatides are mainly a mixture of phosphatidylcholine, phosphatidylethanolamine and also phosphatidylinositide and phytoglyclipids. The phosphatidylcoline is, as a rule, present in the commercial products in an amount of only about 20%.

A process for the purification of soya phosphatide fractions which are to be used as emulsifiers for intravenously injectiable fat emulsions is known from the Swith patent specification No. 361,088 and U.S. patent spcification No. 2,945,869. In this process, alcoholic solutions of crude phosphatides from which the oil has previously either been removed or greatly reduced are treated with aluminium oxide, magnesium oxide and/or activated carbon in order to free them from cephalin and especially to reduce as far as possible their content of inositol-containing phosphatides, which on intravenous administration to cats cause a lowering of blood pressure. This procedure, however, requires first removal of oil from the commercial crude phosphatides, then extraction with alcohol followed by treatment of the alcoholic solution with adsorbent materials. Whether the treatment in this process is carried out using an aluminium oxide column or an aluminium oxide slurry is immaterial; in all these cases the resulting phosphatidylcholine showed a purity not exceeding 70%. More far-reaching reduction in, or even complete freedom from, cephalin could not be obtained by these processes.

A further process is known from our own German patent specification No. 1,053,299 for obtaining natural cholinephosphoric-acid diglyceride esters free of colamine-phosphoric-acid diglyceride esters by column chromatograpy treament using, inter alia, aluminium oxide as the adsorbent. Here again, an alcoholic extract of the crude phosphatide from which the oil has previously been removed is used. This prior removal of oil is achieved by repeated extraction with acetone, which is very time-consuming and in the course of which a considerable part, i.e. about 40 to 45%, of the phosphatidylcholine originally present is lost. Although this process yields chemically pure, i.e. cephalin-free, choline esters of the diglyceride phosphoric acid, it is, nevertheless, not completely satisfactory because of the necessary preceding removal of oil from the crude phosphatides and the high losses of phosphatidylcholine.

The process of the present invention starts from the commercially available lecithins, that is to say, from lecithins still containing a great deal of oil, which are dissolvied in suitable non-alcoholic solvents whereupon the adsorbent can be added immediately. Surprisingly, it has been found that, contrary to previous knowledge and practice, it is possible to achieve a quantitative separation of the phosphatides in a simple manner using ethyl acetate and/or dischlorinated hydrocarbons with 1 to 4 carbon atoms as the solvent.

Accordingly, the present invention comprises a process for obtaining highly purified phosphatidylcholine with a high content of essential fatty acids from vegetable lecithins by adsorption of the phosphatides on aluminium oxide and extraction with alcohol during which process the crude oil-containing phosphatide is first dissolved in ethyl acetate or a dichlorinated hydrocarbon having 1 to 4 carbon atoms or a mixture of such solvents, then the solution treated with a quantity of aluminium oxide at least five times the amount of the crude phosphatide used, after which the aluminium oxide is separated and the phosphatidylcholine eluted therefrom by means of an alcohol.

I was not to be expected that the oil of the phosphatide mixture will not impair the adsorption of the phosphatides on aluminium oxide and that, after changing the solvent, the desired separation of the various phosphatide fractions can be effected immediately and the choline-containing glycero-phosphatide fraction isolated by mere elution of the aluminium oxide with alcohol.

In carrying out the process of the invention, the aluminium oxide, after suspending it and stirring in the lecithin solution, is separated, e.g. by decantation, then stirred for a few minutes with an alcohol having 1 to 3 carbon atoms, and subsequently separated in a decanter. Washing with a little alcohol can be repeated, and the separated aluminium oxide containing the undesirable accompanying substances is discarded or treated in a suitable manner in order to obtain these substances. By distilling the alcohol from the eluate under vacuum a highly purified fraction of natural choline-containing glycero-phosphatides is obtained. The latter is free of, or very poor in, cephalins and has a phosphatidylcholine content of 90% and more.

To dissolve the crude phosphatide, ethyl acetate and/or a dichlorinated hydrocarbon containing 2 to 6% by volume of alcohol is preferable. The aluminum oxide may, before elution with alcohol, be rinsed with one of the solvents originally used or with a mixture of such solvents.

For the protection of the unsaturated fatty acids of the phosphatides, it is advisable to work under exclusion of light and air. If appropriate, an antioxidant, e.g. tocopheral, may be added in small amounts such as, for example, 0.1 to 0.2%, when dissolving the crude phosphatide.

The product obtained, due to its high phosphatidylcholine content of 90% and more, as well as its content of more than 75% of essential fatty acids calculated from the total fatty acids, exerts, on oral administration even at low doses of about 1 g. per day, a valuable metabolic action in many diseases such as arteriosclerosis, diabetes and hyperlipidaemia such action depending, for example, on the lowering of abnormally elevated blood fats.

The following values are typical of the analytical characteristics of the phosphatidylcholine obtained:

Iodine number—100–103
Total phosphorus—3.56%
Choline—13.80%
Fatty acids—69.0%
Phosphorus/choline molar ratio—1.00

Analysis of the fatty acids by means of gas chromatography gives the following average values:

| | Percent |
|---|---|
| Palmitic acid | 13.3 |
| Stearic acid | 2.6 |
| Oleic acid | 7.9 |
| Linoleic acid | 70.7 |
| Linolenic acid | 5.5 |
| | 100.0 |

If a particularly pure phosphatidylcholine, suitable for injections and especially intravenous injections, is desider, the treatment with aluminum oxide may be carried out by adding the solution of the crude oil-containing phosphatide to an aluminum oxide column and eluting the phosphatidylcholine from the adsorbent by means of an alcohol.

The appropriate procedure is to dissolve the crude oil-containing phosphatide, without any pre-treatment, in ethyl acetate and/or the dichlorinated hydrocarbon, preferably with slight heating to a temperature generally not exceeding 37° C., under the protection of an inert gas and with addition of an antioxidant, for example tocopherol, in small quantities, e.g. 0.1 to 0.2%, and to add the solution immediately onto the aluminum oxide column, if possible under the exclusion of light. When the crude phosphatide is dissolved in one of the dichlorinated solvents instead of in ethyl acetate, the gentle heating may be omitted and the material dissolved at room temperature.

Elution of the neutral lipids on rinsing with the solvent can be accelerated by adding 2 to 6% by volume of alcohol to the solution before it is applied to the column. This surprisingly causes that only the neutral lipids are quantitatively extracted from the column.

On final elution of the column with an alcohol, preferably ethanol, a chemically pure natural phosphatidylcholine is obtained while all other accompanying phosphatides as well as phytoglycolipids remain on the column.

This chemically pure phosphatidylchloine which remains after evaporation of the alcohlic solution under vacuum in an atmosphere of an inert gas is an almost colourless mass of paste-like consistency. Yields up to 88% can be obtained. The phosphatidylcholine is easily soluble in alcohol, ethyl acetate, ether and many chlorine-containing solvents, but only very slightly soluble in acetone. A typical analysis shows the following values:

Total phosphorus—3.80%
Choline—14.90%
Fatty acids—69.00%
P/choline molar ratio—1
Fatty acids/choline molar ratio—2
Iodine number—100–105

Analysis of the fatty acids by gas chromatography gives the following average values:

| | Percent |
|---|---|
| Palmitic acid | 12.7 |
| Stearic acid | 3.2 |
| Oleic acid | 7.8 |
| Linoleic acid | 70.6 |
| Linolenic acid | 5.7 |
| | 100.0 |

Among the solvents mentioned for the elution of the neutral lipids, ethyl acetate is the most frequently applied, even though, as was mentioned above, this requires heating to obtain complete dissolution of the commercial crude phosphatide, and addition of the solution to the adsorption column while it is still warm. It is not necessary to heat the column jacket; the crude phosphatide solution is taken up by the adsorbent without difficulty. Heating is also unnecessary if 10 to 15% of a dichlorinated hydrocarbon with 1 to 4 carbon atoms are added to the ethyl acetate; a clear solution of the crude phosphatide is then obtained even at room temperature. In this case the neutral lipids can also be eluted with ethyl acetate.

The concentration of the crude phosphatide solution to be applied to the adsorption column should be between 1 and 20%. Solutions of even higher concentrations can also be used, but they may, under certain circumstances, slightly block the column. Concentrations between 3 and 10% are the most suitable.

Basic and neutral aluminum oxides, but preferably basic aluminum oxides of activity grade 1 to 3, and products standardized according to Brockmann, can be used as the adsorbent.

Monohydric aliphatic alcohols containing 1 to 3 carbon atoms can be used as the alcohol for the elution of the phosphatidylcholine. Ethyl alcohol, which is mostly applied, should preferably be used mixed with water, the alcohol content being 80 to 96%; the latter concentration is particularly advantageous since it is commercially available.

The process of the invention makes it possible to seuarate the phosphatides from the neutral lipids by a simple treatment using an aluminum oxide column. In this process, the biologically active essential fatty acids present in very high proportions in the phospholipid fraction in a choline-phospholipid combination are preserved to a very high degree. In addition, this process results in a very high degree of purity of the phosphatidylcholine while also giving particularly good yields.

The invention is illustrated in the following examples:

EXAMPLE 1

100 g. of commercial crude soya bean phosphatide with a phosphatidylcholine content of 19.5% are dissolved in 1.5 l. of methylene chloride or methylene chloride/ethanol (95:5) and the solution vigorously stirred for 1 hour with 500 g. of aluminum oxide. After separation of the adsorbent, this is briefly stirred several times with successive portions of about 300 ml. of methylene chloride or methylene chloride/ethanol (95:5) and after each stirring separated from the solvent. The solutions thus obtained are combined and treated with another 500 g. of aluminum oxide in the same way. The total solution are combined and the solvent removed by distillation.

34 g. (corresponding to 34%) of intensely yellow-coloured oil remain. The aluminum oxide left over from the first stirring process is immediately stirred for a few minutes with about 300 ml. of ethanol and decanted. Washing and decantation are repeated for 2 or 3 times. The alcoholic solutions are combined, added to the aluminum oxide of the second stirring process, and vigorously stirred for about 15 minutes. After separation, the remaining aluminum oxide is repeatedly eluted with successive portions of about 300 ml. of ethanol and decanted. All alcoholic solutions are combined, and the solvent removed by distillation under vacuum in the presence of an inert gas. A practically cephalin-free and almost pure phosphatidylcholine remains. Yield: 13 g.=67%.

EXAMPLE 2

100g. of crude soya bean phosphatide from a different source, containing 28.5% of phosphatidylcholine, are dissolved in 2 l. of ethyl acetate to which 5% of dichoroethane have been added, and stirred twice for 1 hour with 2 successive 600-g. portions of aluminum oxide and further treated as directed in Example 1. The neutral lipids are eluted with ethyl acetate/dichloroethane (95:5). The yield after evaporation of the solvent is 29 g.=29%. The choline-containing glycero-phosphatide fraction is obtained by means of ethanol, as in Example 1. The yield after distillation of the solvent under vacuum and inert gas is 12.5 g.=61%.

EXAMPLE 3

60 g. of commercial crude phosphatide from soya beans, containing 20% of phosphatidylcholine, are dissolved in 1 l. of dichloroethane or dichloroethane/ethanol (95:5), stirred twice for 1 hour with 360-g. portions of aluminum oxide, and treated as in Example 1. In order to separate the neutral lipids elution is effected with 3 successive 200-ml. portions of dichloroethane/ethanol (95:5). Yield of neutral lipids after evaporation of the solvent: 18.6 g.=31%. The residual aluminum oxide is eluted 3 or 4 times with successive 200-ml. portions of ethanol, as directed in Example 1. 7.2 g. of a highly purified phosphatidyl fraction is obtained from the combined ethanolic solutions, corresponding to a yield of 60%.

EXAMPLE 4

40 g. of commercial crude soya bean phosphatide are dissolved in 800 ml. of ethyl acetate with concomitant heating to 37° C. under an inert gas. The solution, while still warm, is added to an adsorption column of 4 cm. in diameter and 50 cm. in length packed with a slurry of 500 g. of aluminum oxide in ethyl acetate, care being taken that no significant cooling of the solution occurs. After the crude phosphate is adsorbed, the adsorbent is rinsed with about 1.3 l. of ethyl acetate. The ethyl acetate eluates contain the entire neutral lipid which, after evaporation of the solvent under vacuum, remains in the form of 11.0 g. (=28.0%) of intensely yellow-coloured oil. In order to elute the lecithin about 1.7 l. of ethanol (96%) are allowed to flow through the column. After distillation of the alcohol under vacuum in the presence of an inert gas, 6.8 g. of chemically completely pure phosphatidylcholine are left, i.e. 75% of the amount present in the original crude phosphatide.

EXAMPLE 5

40 g. of crude soya bean phosphatide of different origin are dissolved in 400 ml. of ethyl acetate to which 10 to 15% of dichloroethane, dichloromethane or dichloroethylene respectively have been added to improve its dissolving power. If necessary, the non-lipid-like impurities are removed by allowing the solution to settle, followed by filtration or centrifugation. As in Example 1, the solution is then added to a column of a slurry of 500 g. of aluminum oxide in ethyl acetate. Further treatment is performed as in Example 1. Yield of neutral lipids: 12.4=31.0%. Yield of chemically pure phosphatidylcholine: 5.8 g.=72:5%.

EXAMPLE 6

72 g. of commercial crude soya bean phosphatide are dissolved, with gentle stirring and introduction of nitrogen, in 360 ml. of methylene chloride or a mixture of methylene chloride and ethanol (95:5). If necessary, the solution is freed of non-lipid-like impurities, then added to an adsorption column of 4 cm. in diameter and 80 cm. in length packed with a slurry of 1000 g. of aluminium oxide in methylene chloride or in a methylene chloride/ethanol mixture (95:5). When the crude phosphatide is adsorbed, the methylene chloride/ethanol mixture (95:5) is allowed to flow through the column until all neutral lipids have been eluted from the column. This requires about 2 l. of solvent mixture. After removal of the solvent by evaporation in a nitrogen atmosphere, 23 g. (=31.5%) of intensely yellow-coloured oil are left. In order to obtain the phosphatidylcholine, the column is now eluted with about 3.5 l. of ethanol and the alcohol finally distilled off under vacuum and with a stream of inert gas. Yield of chemically pure phosphatidylcholine: 11.0 g.=76%

EXAMPLE 7

37 g. of commercial crude soya bean phosphatide are dissolved with mild heating or gentle stirring, under the protection of an inert gas, in 370 ml. of dichloroethane containing 5% of ethanol. If necessary, the solution is filtered or centrifuged and subsequently added at room temperature to a slurry of 500 g. of basic aluminum oxide in dichloroethane or dichloroethane containing 5% of ethanol packed into an adsorption column of 4 cm. in diameter and 50 cm. in length. When the crude phosphatide is adsorbed, elution is effected with about 1.5 l. of dichloroethane/ethanol (95:5) to achieve quantitative separation of the neutral lipids. The entire eluate which has passed through the column is combined and evaporated under vacuum and under nitrogen. The residue consists exclusively of neutral lipids. Yield: 11.6 g.=31.4%. For the subsequent elution of the phosphatidylcholine, about 2 l. of ethanol are allowed to flow through the column. After evaporation of the ethanol under vacuum and protection of an inert gas, 5.3 g. of chemically pure phosphatidylcholine are left, representing 73% of the amount contained in the crude phosphatide.

EXAMPLE 8

34 g. of commercial oil-containing lecithin are dissolved with gentle stirring and under a stream of inert gas in 170 ml. of technical dichloroethylene, and the solution added to an adsorption column packed with a slurry of 400 g. of basic aluminum oxide of activity grade 2 in dichloroethylene or dichloroethylene/ethanol (95:5). The further treatment takes place as directed in Example 3. The neutral lipids are eluted with about 1.0 l. of dichloroethylene, containing 5% of ethanol. Yield of neutral lipids: 11.6 g.=34%. To obtain the chemically pure phosphatidylcholine, elution is effected with about 1.5 l. of ethanol. Yield: 5.5 g.=80% of the lecithin present in the crude phosphatide.

EXAMPLE 9

40 g. of crude oil-containing phosphatide are dissolved in 1.3 l. of propylene dichloride and the solution added to an adsorption column of 4 cm. in diameter and 45 cm. in length packed with 550 g. of aluminium oxide suspended in propylene chloride. The entire neutral lipids are eluted with about 1.2 l. of propylene chloride to which 5% of ethanol have been added. Yield of neutral lipids after evaporation of the solvent: 13.6 g.=34%. The subsequent elution with about 1.5 l. of ethanol after removal of the solvent under vacuum yields 6.9 g. of pure phosphatidylcholine, i.e. 85%.

EXAMPLE 10

27 g. of commercial crude soya bean phosphatide are dissolved in 670 ml. of ethyl acetate as in Example 4 and the warm solution is added to an adsorption column (4 cm. in diameter, filling height 26 cm.) packed with a slurry of 340 g. of aluminium oxide in ethyl acetate. The further treatment is performed as directed in Example 4. To elute the neutral lipids, about 700 ml. of ethyl acetate are required. Yield after distillatiton of the solvent 8.8 g.=32.5%.

The phosphatidylcholine is eluted from the column with about 800 ml. of ethanol. Yield after evaporation of the alcohol under vacuum with inert gas protection is 5 g.=87.5%.

It will be obvious to those skilled in the art that various changes may be made without departing from the scope of the invention, and the invention is not to be considered limited to what is described in the specification.

The claims of the invention are:

1. Process for obtaining highly purified phosphatidylcholine with a high content of essential fatty acids from vegetable lecithins, comprising dissolving of the crude oil-containing phosphatide consisting essentially of phosphatidylcholine, phosphatidylethanolamine, phosphatidylinositide and phytoglycolipids in ethyl acetate or a dichlorinated hydrocarbon having 1 to carbon atoms or a mixture of such solvents to provide a clear solution, treatment of the resulting solution with a quantity of aluminium oxide at least five times the amount of the crude phosphatide used in order to adsorb the crude phosphatides on the aluminum oxide, separation of the aluminum oxide and elution of the phosphatidylcholine therefrom by means of an alcohol.

2. Process according to claim 1, in which the solution of the crude oil-containing phosphatide is added to an aluminium oxide column.

3. Process according to claim 1, in which, before elution with alcohol, the aluminum oxide is washed with one or more of the solvents specified for use in preparing the solution.

4. Process according to any one of claims 1, 2, or 3, in which the ethyl acetate and/or dichlorinated hydrocarbon used as the solvent or for washing the adsorbent contains 2 to 6% by volume of an alcohol.

5. Process according to any one of claims 1, 2, 3, or 4, in which the phosphatidylcholine is eluted from the aluminum oxide with ethanol.

6. Highly purified phosphatidylcholine obtained by the process claimed in claim 1.

References Cited

UNITED STATES PATENTS

| | | | |
|---|---|---|---|
| 2,371,476 | 3/1945 | Sifferd | 260—403 |
| 2,945,869 | 7/1960 | Meyer et al. | 260—403 |

ELBERT L. ROBERTS, Primary Examiner